US011354741B1

(12) United States Patent
Stevens

(10) Patent No.: US 11,354,741 B1
(45) Date of Patent: Jun. 7, 2022

(54) USER INTERFACE ENABLING UNCONSTRAINED DATA INPUTS TO A CONSTRAINED SYSTEM

(71) Applicant: Chicago Mercantile Exchange Inc., Chicago, IL (US)

(72) Inventor: Richard Stevens, Kent (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 17/176,074

(22) Filed: Feb. 15, 2021

(51) Int. Cl.
*G06Q 40/04* (2012.01)
*G06Q 50/18* (2012.01)

(52) U.S. Cl.
CPC .......... *G06Q 40/04* (2013.01); *G06Q 50/188* (2013.01)

(58) Field of Classification Search
CPC ...................... G06Q 40/04; G06Q 50/188
See application file for complete search history.

(56) References Cited

U.S. PATENT DOCUMENTS

| 6,766,304 | B2 | 7/2004 | Kemp, II et al. |
| 6,772,132 | B1 | 8/2004 | Kemp, II |
| 7,831,491 | B2 | 11/2010 | Newell |
| 7,877,316 | B2 | 1/2011 | Adcock |
| 7,890,417 | B2 | 2/2011 | Hanson et al. |
| 7,966,249 | B1* | 6/2011 | Dawson ............... G06Q 40/00 705/37 |
| 8,380,612 | B2 | 2/2013 | Hanson |
| 8,392,319 | B2 | 3/2013 | Hansen |
| 10,430,884 | B2 | 10/2019 | Lee |
| 10,475,123 | B2 | 11/2019 | Bawadhankar |
| 2005/0096999 | A1 | 5/2005 | Newell |
| 2008/0016010 | A1* | 1/2008 | Nanjundamoorthy ....... G06Q 40/10 705/36 R |
| 2014/0089161 | A1 | 3/2014 | Robbins |
| 2015/0161727 | A1 | 6/2015 | Callaway |
| 2017/0331774 | A1 | 11/2017 | Peck-walden |
| 2020/0394710 | A1 | 12/2020 | Konduru |

FOREIGN PATENT DOCUMENTS

| WO | WO-0227606 A2 * | 4/2002 | ............. G06Q 40/04 |
| WO | WO-2011049936 A2 * | 4/2011 | ............. G06Q 40/04 |

OTHER PUBLICATIONS

ISDA: Block Trade reporting for over-the-counter derivatives markets, Jan. 18, 2011, pp. 1-37 (Year: 2011).*
Turvey, Michael: Advanced Stock Order Types to Fine-Tune Your Market Trades, Jan. 8, 2020, Ticker Tape, Ameritrade, pp. 1-5 (Year: 2020).*
theice.com: ICE Swap Trade, Apr. 2016, pp. 1-4, (Year: 2016).*
James Chen, "What is a Block Trade", Investopedia, Oct. 1, 2020, https://www.investopedia.com/terms/b/blocktrade.asp.
"Block Trade Fundamentals", FIA, 3 pages.

(Continued)

*Primary Examiner* — Bijendra K Shrestha
(74) *Attorney, Agent, or Firm* — Lempia Summerfield Katz LLC

(57) ABSTRACT

A system and a method automatically enable unconstrained inputs of data including a price that relate to a proposed new or modified trade orders between counterparties for submission to an electronic trading system that enforces constraints on the inputs relating to the proposed trades that can be submitted by the counterparties.

23 Claims, 10 Drawing Sheets

(56) References Cited

OTHER PUBLICATIONS

"Block Trade", Wikipedia, 2 pages, Jul. 3, 2020.
"ICE Futures Europe Block Trades and Asset Allocations", ICE Futures Europe, Sep. 2020, 19 pages.
"Understanding Block Trades", CME Group, Nov. 1, 2017, 5 pages.
CME Group, "Block Trades—What is a Block Trade"? 1 page, 2021.
CME Group, "Block Trades", 2 pages, 2021.
ICE Futures U.S., Block Trade—FAQs, Dec. 1, 2020, 16 pages.
ICE Futures U.S., Block Trade FAQs, Mar. 13, 2008, 8 pages.
ICE Swap Trade, LLC, Block Trade—FAQs,Dec. 2017, 4 pages.

* cited by examiner

Price Blending by Price Level Example

| Trade Price | Trade Volume | Resolved Volume at 1.0 | Resolved Volume at 1.5 |
|---|---|---|---|
| 1.0 | 1,000 | 1,000 | 0 |
| 1.1 | 1,000 | 800 | 200 |
| 1.2 | 1,000 | 600 | 400 |
| 1.3 | 1,000 | 400 | 600 |
| 1.4 | 1,000 | 200 | 800 |
| 1.5 | 1,000 | 0 | 1,000 |

FIG. 10

USER INTERFACE ENABLING UNCONSTRAINED DATA INPUTS TO A CONSTRAINED SYSTEM

BACKGROUND

Electronic data processing systems, such as electronic transaction processing systems and electronic trading systems, often, as function of convenience and/or necessity, place constraints on the data which may be provided as inputs thereto, such as type of data, e.g. numeric vs. text, the size of the data, e.g., the number of digits, characters or bytes, the number of decimal places, e.g., the precision, minimum/maximum value, minimum/maximum change in value, as well as other limitations. In other words, constraints may be assertions about the desired properties of the data and/or the desired relationship among a set of data.

As a matter of convenience, such constraints may simplify the implementation, e.g., the programming, of the electronic transaction processing system, and/or allow the system to be implemented with fewer or less costly resources, e.g., using lower capability processors, less memory and/or less data storage. As a matter of necessity, allowing unconstrained inputs may make an electronic transaction processing system cumbersome or otherwise impractical to implement or use. For example, in systems which compare two separate inputs to determine a match, if those inputs are constrained to a limited set of values, the system may need to perform fewer comparison operations to determine a match, i.e., less input variability results in higher likelihood two inputs will match. In another example, the use of constraints may simplify the construction and maintenance of user interfaces, data structures, computational components, etc. of the electronic data processing systems.

However, in some situations, while constraining inputs may benefit some aspects or uses of the electronic transaction processing system, these same constraints may also unduly restrict other aspects thereof.

BRIEF DESCRIPTION OF THE DRAWINGS

FIG. 10 illustrates a table showing price blending by price level according to an embodiment.

DETAILED DESCRIPTION

Figure 1:
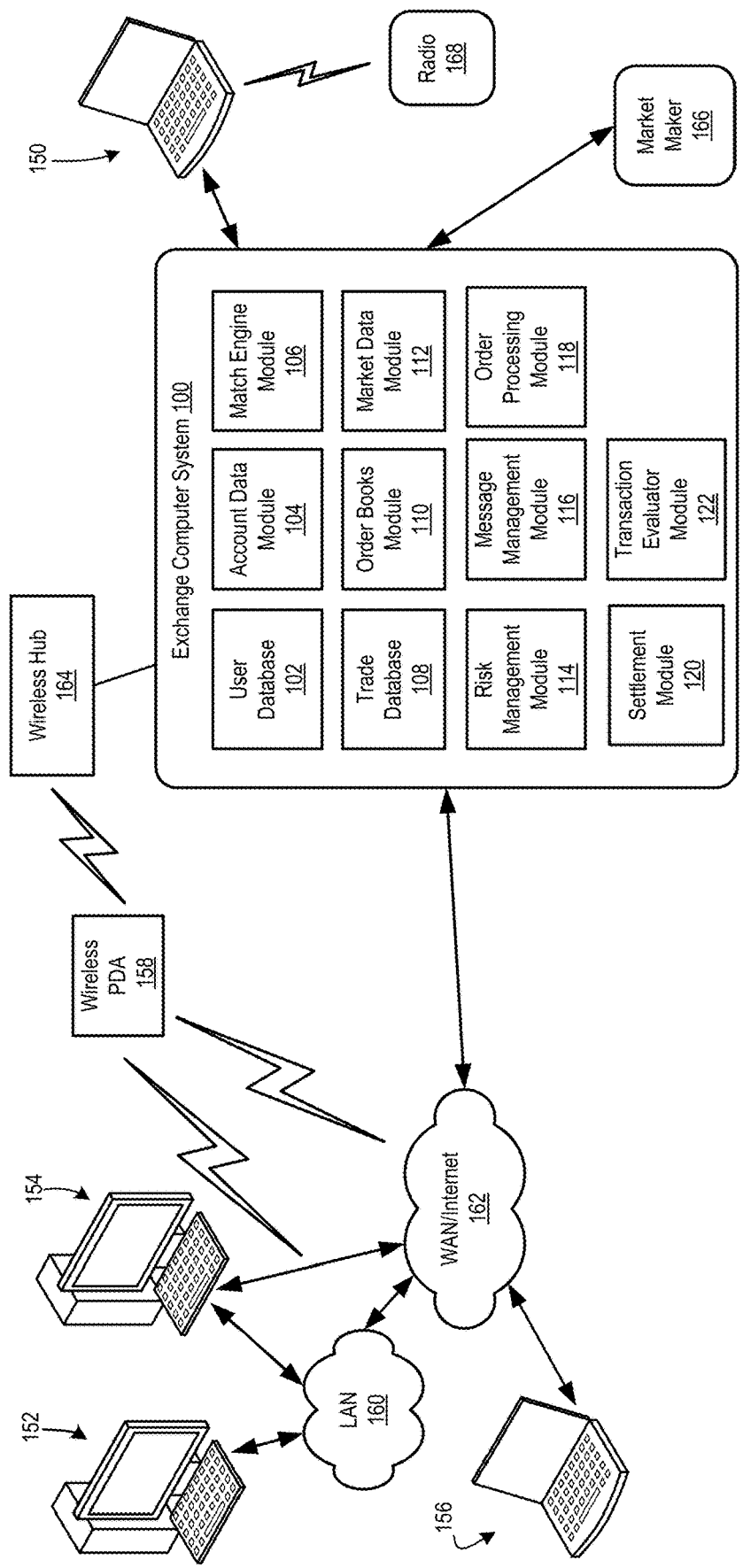
FIG. 1 depicts an exchange computer and network system, according to some embodiments.

The disclosed embodiments relate to a system and a method for automatically enabling unconstrained inputs of data, e.g., inputs that relate to proposed new or modified trade orders for submission to an electronic trading system, e.g., a quantity and a price for a financial product, from counterparties in an electronic data transaction system, e.g., an electronic trading system, that enforces constraints, e.g., a minimum increment for a price and/or a minimum quantity for financial products, on the inputs relating to the proposed trades that can be submitted by the counterparties.

In particular, the disclosed embodiments relate to a user interface that receives unconstrained inputs provided by one counterparty that relate to a proposed trade with another counterparty, e.g., a bilateral trade, and that transmits the inputs to a processor via a network in an electronic trading system that enforces constraints in the inputs. In this embodiment, even though the electronic trading system enforces constraints in the inputs, e.g., the trade price is constrained to a minimum increment and/or the trade is constrained to a minimum quantity, the user interface enables the one counterparty to enter inputs without constraints, e.g., the price is not constrained to a minimum increment.

The disclosed embodiments enable the counterparties to agree on a price that does not comply with the constraints, e.g., the agreed price does not comply with the minimum increment of the price. Upon determining that the agreed price does not comply with the constraints, the disclosed embodiments generate a plurality of trade orders for the financial product that comply with the constraints where the overall result thereof is identical to the agreed trade, e.g., the total traded quantity total price paid are the same. For example, each of the plurality of orders complies with the minimum trade quantity and with the minimum increment of the price.

Bilateral trading refers to transactions which are entered into, e.g. negotiated and consummated, directly between the transacting parties. Such trades are also referred to as Over the Counter ("OTC"). As each party bears the risk that the other party will not perform their side of the agreement, part of the bilateral trading process typically involves establishing counter-party credit, or otherwise establishing credit relationships with potential counterparties for use in future transactions, to mitigate the risk of loss due to a counter party's failure to perform. With a credit relationship established, the parties then exchange/negotiate the terms of the instrument being traded until mutually agreed upon terms are or are not reached. Once the parties agree to the terms of an instrument or the transaction therefore, they may submit the transaction to a centralized clearing and settlement system, such as the Continuous Linked Settlement (CLS) system, which may handle the process of completing the transaction between the parties. If the parties do not agree, they may simply walk away. OTC trades/instruments may include transactions for options contracts and swaps, such as forward swaps, currency swaps, interest rate swaps, volatility swaps, variance swaps, etc. As will be discussed, OTC trades/transactions may also be entered into for exchange-traded instruments, e.g. futures contracts.

One example of bilateral trading is a block trade. A block trade is a privately negotiated transaction for an OTC-instrument e.g., a swap contract, or an exchange-traded instrument, e.g., a futures or option on futures transaction that is executed apart from the public auction market that is permitted in designated contracts subject to specified conditions, e.g., the block trade may be required to be for a minimum quantity which is significantly larger than ordinarily traded.

In contrast to OTC trading, central counter party based trading utilizes an intermediary entity to separate the transacting parties such that they are prevented from transacting directly with one another. For example, a central counterparty based electronic trading system, such as a futures exchange, such as the Chicago Mercantile Exchange Inc. (CME), provides a contract market where standardized financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price, referred to as the strike price, on or before a certain expiration date. An option contract offers an opportunity to take advantage of futures price moves without actually having a futures position and is considered "in the money" when the strike price is favorable to the market price of the underlier. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option. Options contracts traded via a central counterparty-based trading system may be referred to as Exchange Traded Derivative (ETD) options or ETD options contracts.

Typically, the terms and conditions of each futures or options contract are standardized as to the specification of the contract's underlying reference commodity, the composition of the commodity, quantity, delivery date, and means of contract settlement. Such standardization may improve the liquidity of these contracts, e.g. the ease with which such contracts may be bought or sold. Terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk on behalf of the transacting parties as well as the exchange. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system may operate under a central counterparty model, where the exchange acts, e.g., using the clearing mechanism described above, as an intermediary between market participants for the transaction of financial instruments. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

While a central counter party-based trading system may offer certain advantages, such as anonymity and risk management, bilateral trading may still often be utilized in situations where the parties prefer not to use a central counterparty, e.g. due to cost, efficiency or other concerns, where the parties wish to complete a transaction as quickly as possible, and/or for non-standard transactions or unique transactions where the transaction terms are not standardized and/or the number of potential suitable and/or interested counter parties may be limited. For example, foreign exchange (FX) products/currency exchange transactions, such as transactions in non-deliverable currencies, foreign exchange forward or swap agreements, are typically entered into as bilateral transactions.

In the OTC FX markets in particular, and likely in other OTC markets, large size transactions are negotiated to precise price levels. The disclosed embodiments use block trading as a mechanism that may be used by electronic trading exchanges to provide a pathway for large trades to be transacted as futures, with the price negotiation taking place away from the central limit order book and at the precise price levels desired by the transacting parties.

As stated above, a block trade is a privately negotiated futures or option on futures transaction, such as for foreign exchange or other instruments, e.g., EUR/USD futures contracts, that is executed apart from the public auction market that is permitted in designated contracts subject to specified conditions. Block trades are trades for a large quantity, as defined by the Exchange, of a particular financial instrument, The Exchange designates the financial instruments in which block trades are permitted and determines the minimum quantity threshold for such transactions. For example, the Exchange may determine that a block trade involves at least 10,000 shares of stock. A block trade must be for a quantity that is at or in excess of the applicable minimum threshold. Orders may not be aggregated in order to achieve the minimum transaction size, except by certain entities designated by the Exchange, i.e., a commodity trading advisor. Block trades should not set off conditional orders or otherwise affect orders in the regular market. Block trades are negotiated directly between the parties, typically to avoid market impact and in order to obtain a better price than might be obtained from the regular market. When a block trade is for a standardized financial instrument, such as a futures contract, the parties are limited in their negotiations by the standardized parameters of the contract, such as the trade price tick size. The exchange rules and the surrounding regulations require that block trades occur at regular contract tick increments, and it is often the case that the appropriate tick increment for a contract in a central limit orderbook, is not suitable for the block trade.

Unless otherwise agreed to by the principal counterparties to the block trade, the seller must ensure that each block trade is reported to the Exchange within the time period and in the manner specified by the Exchange. The report must include the contract, contract month, price, quantity of the transaction, the respective clearing members, the time of execution, and, for options, strike price, put or call and expiration month. The Exchange shall promptly publish such information separately from the reports of transactions in the regular market. Further, block trades must be reported to the Clearing House in accordance with an approved reporting method.

The disclosed embodiments provide a mechanism that enables more granular pricing for block trades but resides with the rules and regulations and enable greater use of futures or other instruments for transacting large size trades.

In order to achieve more granular pricing for block trades, the disclosed embodiments may use price blending. Price blending is a system where trades take place at two distinct price levels in such a manner that the average price of the combined trade is at a particular level between the two prices traded. In essence, with the aid of price blending, block transactions can be quoted with tighter price granularity. Block trades can operate in this solution with an effective tighter tick increment.

For additional details and descriptions of a system using coupon blending, see U.S. Pat. No. 10,475,123, filed on Jul. 22, 2014, entitled "Coupon Blending of Swap Portfolio", assigned to the assignee of the present application, the entirety of which is incorporated by reference herein and relied upon.

For additional details and descriptions of a system/method for dynamically adjusting tick sizes so that a tick size aligns with different financial instrument markets, see U.S. Application Publication No. 2020/0394710 A1, filed on Jun. 13, 2019, entitled "Dynamic Increments for Related Objects", assigned to the assignee of the present application, the entirety of which is incorporated by reference herein and relied upon.

A Request for Quote (RFQ) is an electronic notification sent, for example, to all CME Globex, or other electronic trading system participants that expresses interest in a specific strategy or instrument. A Directed Request for Quote (DRFQ) is a system which enables bilateral negotiation of block trades via, for example, the CME Direct front end software. A Directed RFQ is available in CME Direct for privately negotiated transactions, in which participants request and negotiate quotes for block trades and subsequent submission.

The disclosed embodiments may utilize the DRFQ functionality and permit block trades to be negotiated at more granular prices, with the caveat that transactions concluded at a price level which is not a standard price level will result in at least two block trades occurring, each at acceptable price levels.

The degree of increased granularity can be decided by the system on a case by case basis, however it should be noted that for a given starting set of standard price levels and minimum block trade size, a more granular price requires a higher threshold size to participate in the solution.

The implementation of a user interface that allows users to input data that is not constrained by the electronic data processing systems is a technical implementation to solve problems therewith, such as restrictions on the granularity of the parameters that a user can input when the parameters do not follow the system input constraints, which may be based on rules and regulations imposed by, or technical limitations of, the electronic data processing systems. For example, in the OTC FX markets in particular, and likely on other OTC markets, large size transactions may be negotiated to precise levels. Exchange rules and surrounding regulations require that large size trades occur at regular tick increments. The requirement of a regular tick increment for large sized transactions is a technical problem with the constrained system data inputs since often the appropriate tick increments for a contract in a central limit orderbook is not suitable for large size transactions. As such, the disclosed embodiments provide technical solutions to these technical problems.

Further, there are a number of problems relating to displaying and processing granular pricing information for data involving large size transactions using graphical user interfaces (GUIs). These problems generally relate to effective presentation of a large volume of constantly changing information in a manner which allows a user to assess the information, identify advantageous opportunities/conditions, make decisions and execute those decisions in an efficient and accurate manner to implement strategies and take advantage of those advantageous opportunities before conditions change.

The disclosed embodiments provide an improved electronic data transaction system that provides greater accessibility and standardization for all participants and therefore provide a specific and practical application which improves upon prior electronic data transaction systems and provides additional functionality not previously provided. For example, the disclosed embodiments enable unconstrained data values to be used with a system having constrained inputs, e.g., the disclosed embodiments enable pricing at tighter granularity for block trades, whilst remaining consistent with the rules and regulations on price levels. The disclosed embodiments may use a system of price blending to enable large size transactions to be completed as a more granular price.

The disclosed embodiments solve problems which uniquely arise in the fields of computer technology and electronic data transaction processing systems. Thus, the disclosed embodiments are rooted in computer technology in order to overcome problems specifically arising in electronic data transaction systems. Indeed, the subject technology improves the functioning of the electronic data transaction processing system by enabling the user to enter inputs that are not constrained without having to modify the electronic data transaction processing system and by improving the efficiency of the bilateral deal consummation, improving the reliability of deal submission and reducing operational risk to submitter, i.e., since the step of calculating the plurality of trades that comply with the constraints imposed by the electronic trading system happens accurately and near-instantaneously, saving precious time in the deal submission window. Furthermore, using the disclosed embodiments, the OTC deal may also be submitted faster, allowing for it to hit risk systems faster and lowering market risk for both counterparties.

Generally, as will be described in more detail below, the user interface of the disclosed embodiments presents the parameters of a negotiated transaction, including total agreed upon price and the parameters of each trade order including side, product, term, units, price, quantity, etc. The price and quantity for the plurality of trades that are executed by the electronic trading system are defined by the operation of the disclosed embodiments as will be described. If the deal is negotiated via CME Direct, this data may be automatically populated.

The disclosed embodiments may be implemented in association with a data transaction processing system that processes data items or objects, such as an exchange computing system which implements electronic trading, also referred to as an electronic trading system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity/amount of a product at a specified price. Products, e.g., financial instruments, or order books representing the state of an electronic marketplace for a product, may be represented as data objects or data structures within the exchange computing system. The instructions may also be conditional, e.g., buy or sell a quantity of a product at a given value if a trade for the product is executed at some other reference value.

While the disclosed embodiments may be described with respect to electronic data transaction request and result messages, it will be appreciated that the disclosed embodiments may be implemented with respect to other technologies or messaging mechanisms later developed.

Electronic trading systems generally ensure open market access to all traders and provide a variety of methods from which traders may choose to connect to the system to send orders and receive market data. Traders connect with these electronic trading systems via public and/or private electronic communications networks which enable traders to submit trade orders and receive the results thereof.

These electronic trading systems are generally implemented using three components: mainframe computers (host), communication servers, and the exchange trading computers (client). Some electronic trading systems use distributed architectures to locate system components geographically proximate to the traders in order to address latency issues and improve access as compared to centralized systems by minimizing differences in the distance from each trader to a connection to the electronic trading system and/or to the systems which implement the electronic markets so as to minimize the impact of any latency issues. However, other latency issues have been identified which may occur outside of the control of the electronic trading systems, e.g. outside of the electronic trading systems' networks and processing systems.

Generally speaking, traders receive and process information, such as changes to a given market or other event, in order to make trading decisions, i.e. whether or not to submit an order to trade and what that order should contain. Accordingly, in terms of responding to changes in a market, one of the general latency components, variations in which may affect a trader's ability to capitalize on a given event at all, or as compared with other traders: the latency in learning about the event, e.g. the latency from the time the event occurs until the trader receives data indicative thereof from the electronic trading system; the latency in consuming/processing the received information and generating a suitably responsive order; and the latency in communicating/transmitting the generated order back to the electronic trading system.

A financial instrument trading system, such as a futures exchange, referred to herein also as an "Exchange", such as CME or the Electronic Broking Services (EBS), provides a data transaction processing system which implements a contract market where data items, such as financial instruments, for example futures and options on futures, are transacted/traded. The EBS is a wholesale electronic trading platform that is used to trade FX with market-making banks. As stated above, futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Furthermore, there may be many different markets/electronic trading systems/platforms available for trading different products such as options contracts, each offering their specific products, i.e. options on particular underliers. Traders looking to achieve a particular financial goal may trade on one or more of these systems which offer the products they need. Harmonizing among these different available trading systems may facilitate trader convenience, e.g. allow a trader to readily switch among systems, and/or to draw a trader, and their business, from one system to another.

One example of a system which harmonizes between systems is CME Direct, offered by the Chicago Mercantile Exchange Inc. CME Direct is an electronic trading application that allows both traders and brokers access to a full range of functionality for side-by-side online trading of Exchange-listed and OTC markets.

In some cases, traders may wish to enter into bilateral/OTC transactions involving exchange traded instruments. For such transactions, clearing systems have been developed. OTC clearing refers to a process under which standardized derivative contracts which relate to over-the-counter transactions will be cleared through an agency established by a stock or commodities exchange. The point of OTC clearing is to avoid having the effect of financial shocks amplified through means not supervised by the agencies, to encourage transparency of the pricing of these standardized financial products, and to mitigate credit and default risks associated with over-the-counter trading. In banking and finance, clearing denotes all activities from the time a commitment is made for a transaction until it is settled. This process turns the promise of payment (for example, in the form of a cheque or electronic payment request) into the actual movement of money from one account to another. In trading, clearing may be necessary because the speed of trades is much faster than the cycle time for completing the underlying transaction. It involves the management of post-trading, pre-settlement credit exposures to ensure that trades are settled in accordance with market rules, even if a buyer or seller should become insolvent prior to settlement. Processes included in clearing are reporting/monitoring, risk margining, netting of trades to single positions, tax handling, and failure handling.

One exemplary OTC clearing system is CME ClearPort offered by the Chicago Mercantile Exchange Inc. CME ClearPort is a comprehensive set of flexible clearing services for the global OTC market and supports clearing of standardized products, e.g. ETD options and futures, traded via privately negotiated transactions. CME ClearPort provides commissioned Brokers, Traders, and Asset Managers with an interface where transactions are posted, credit calculated and approved, and the transactions are processed by the clearinghouse. Brokers, Traders, and Asset Managers can conduct their own transactions off-exchange, negotiate their own prices, and still take advantage of the Exchange clearinghouse by submitting the transactions through CME ClearPort. CME Direct may integrate with CME ClearPort for seamless transaction negotiation and clearing.

Current electronic data transaction systems which implement financial instrument trading systems allow traders/users to submit orders and receive confirmations, market data, and other information electronically via terminals/client computers connected to the system via a data communications network, such as the Internet, a private network or a combination thereof. These "electronic" marketplaces are an alternative to pit based trading systems whereby the traders, or their representatives, all physically stand in a designated location, i.e. a trading pit, and trade with each other via oral and hand based communication, referred to as "open outcry" trading. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

The trading of futures, stocks, bonds, and other financial instruments over computer data communications networks has become a very common activity. In many countries of the world, such stocks, bonds, and other financial instruments are traded exclusively over such computer networks, completely replacing prior trading systems such as "open outcry" trading in trading pits.

Trading of financial instruments, such as futures contracts, typically requires access to multiple types of associated electronic information. For example, to electronically trade a financial instrument, such as a futures contract, an electronic trader typically would like to know the current state of the market for the instrument, i.e. the current ask/sell prices for the instrument as well as current bid/buy prices for the instrument, the associated quantities available, as well as other relevant "market" information, etc.

As the market for a given financial instrument typically changes in real time as other market participants submit orders to buy/sell and these orders are matched and cleared, for an electronic trader to be successful, the multiple types of associated electronic information, referred to as "market data," should be supplied in real-time to allow the electronic trader to make the appropriate decisions based on the most relevant information before the market changes, e.g. because other traders have placed trades for the same instrument. Such market data is typically displayed in multiple windows of a trading user interface presented on a display screen of a computer terminal or other device used by the electronic trader, via interaction therewith, to both view market information and place orders to trade.

In both centralized and distributed systems, such as the EBS or CME systems, market data/views may be sent to each trading entity, such as a bank's trading floor, periodically giving that trading entity an update of the market/order book for traded instruments. These market views may then be redistributed, in turn, to other traders, or to other trading floors, impacting the first traders/trading floors that receive market views less than traders/floors that receive the views later, and in particular, less than the last trader/trading floor to receive the market update.

In view of the operational speed of many financial markets, a strong motivation exists for trading entities, such as hedge funds and banks, to invest heavily in hardware, software, and communications technology to ensure that they can respond to market events quickly, e.g. generate appropriate orders responsive to market data, and ensure that their orders reach the trading system as quickly as possible. This approach requires a heavy financial investment on behalf of the trading entities which tends to minimize the impact of latency issues on the larger entities which are more able to make the investment required. The problem can be less severe on systems that operate on a private communications network but worse on systems that use a public network, such as the Internet, where latencies may vary both over time and over distance, both over a single network route and as between multiple network routes, for communications between the trading entities and the trading system.

To profit in these financial markets, traders must react quickly. A skilled trader with the right tools such as quick software, fast communications and the most sophisticated analytics tools can minimize latency and can significantly improve the electronic trading system performance.

Regardless of what tools are used to enter orders in the financial market, every exchange requires that certain information be included in each order. Each financial market requires the same data that is sent to and received from each trader. Without all of the information, the market will not accept the order. This input and output information is the same for every trader that participates in the financial market.

Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders.

There have been attempts to solve some of the problems with GUIs used for electronic trading. For example, U.S. Pat. No. 6,772,132, entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left, or right across the plane as the market prices fluctuates. This allows the trader to trade quickly and efficiently."

U.S. Provisional Application No. 63/032,345 filed on May 29, 2020, entitled "Single Action Generation and Presentation of Transaction Compliant Parameters for Multiple Interdependent Component Transactions", assigned to the assignee of the present application, the entirety of which is incorporated by reference herein and relied upon, teaches a user interface which enables a trader to define a bilaterally negotiated strategy, including the agreed upon total price, and the component transactions, and automatically, e.g. with a single action, calculate at least one set of prices for all of the component transactions which mathematically net out to the agreed upon total price, conforms to fair and reasonable live market prices, and adheres to venue pricing rules, such as tick increment/size.

However, none of these attempts solves all of the problems associated with GUIs used for electronic trading of large size transactions.

There is, therefore, a need for an improved approach to the problem of negotiating large size transactions, displaying granular pricing for large sized transaction data and allowing a trader to specify the appropriate tick increment for a large size transaction in a central limit orderbook while complying with the exchange rules and the surrounding regulations.

Exchange Computing System

An exchange provides one or more markets for the purchase and sale of various types of products including financial instruments such as stocks, bonds, futures contracts, e.g. the above described POP futures contracts, options, currency, cash, and other similar instruments. Agricultural products and commodities are also examples of products traded on such exchanges. A futures contract is a product that is a contract for the future delivery of a physical commodity, another financial instrument, or other asset such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

The disclosed embodiments may be implemented as a type of hybrid for OTC transactions in exchange-traded (standardized) or OTC-traded instruments which are centrally cleared. In this case, the parties negotiate privately similar to a bilateral system (only for certain products). But once they agree, they submit the trade to the central clearing system which verifies that the traders actually agreed to a price and a quantity for the exchange- or OTC-traded financial product in order to avoid miscommunication and facilitates the exchange. For example, for OTC-traded instruments, the buyer may think that he is buying 5,000 liters of milk whereas the seller may have thought that he was selling 5,000 gallons of milk. In this example, CME will take care of the verification of the prices and the quantities and resolves the miscommunication.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

In one embodiment, traders may buy and sell the disclosed tracking financial instrument instead of a futures contract that is associated with an underlying asset, where the futures contract may be settled by delivery of the underlying asset or by cash settlement.

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the Exchange or electronic trading system operated thereby, the following sequence describes how, at least in part, information may be propagated in such a system and how orders may be processed: (1) An opportunity is created at a matching engine of the Exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e. counter to the resting order; (5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

Electronic Data Transaction Request/Result Messages and Market Data Feeds

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP", or Market By Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774 A1, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation, or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages may carry much more data than MBP messages because MBO messages reflect information about each order, whereas MBP messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An MBP book data object may include information about multiple values. The MBP book data object may be arranged and structured so that information about each value is aggregated together. Thus, for a given value V (e.g., a price), the MBP book data object may aggregate all the information by value, such as for example, the number of orders having a certain position at value V, the quantity of total orders resting at value V, etc. Thus, the value field may be the key, or may be a unique field, within an MBP book data object. In one embodiment, the value for each entry within the MBP book data object is different. In one embodiment, information in an MBP book data object is presented in a manner such that the value field is the most granular field of information.

An MBO book data object may include information about multiple orders. The MBO book data object may be arranged and structured so that information about each order is represented. Thus, for a given order O, the MBO book data object may provide all of the information for order O. Thus, the order field may be the key, or may be a unique field, within an MBO book data object. In one embodiment, the order ID for each entry within the MBO book data object is different. In one embodiment, information in an MBO book data object is presented in a manner such that the order field is the most granular field of information.

Thus, the MBO book data object may include data about unique orders, e.g., all unique resting orders for a product, and the MBP book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate an MBO book object and an MBP book object. It should be appreciated that each book object, or view for a product or market, may be derived from the MBO book object, which includes all the orders for a given financial product or market.

An inbound message may include an order that affects the MBO book object, the MBP book object, or both. An outbound message may include data from one or more of the structures within the exchange computing system, e.g., the MBO book object queues or the MBP book object queues.

The disclosed embodiments may be applicable to the use of either an MBP market data feed and/or an MBO market data feed to report the execution of the plurality of substitute trade orders that comply with the constraints of the electronic trading system.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

As stated above, the disclosed embodiments may be implemented as a type of hybrid for OTC instruments which are centrally cleared. In this case, the parties negotiate privately similar to a bilateral system (only for certain products). But once they agree, they submit the trade to the central clearing system which verifies that the traders actually agreed to a price and a quantity for the financial product in order to avoid miscommunication and facilitates the exchange.

Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An electronic trading system, e.g., an exchange computer system 100, receives messages that include orders and transmits market data related to orders and trades to users, such as via a wide area network 162 and/or a local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
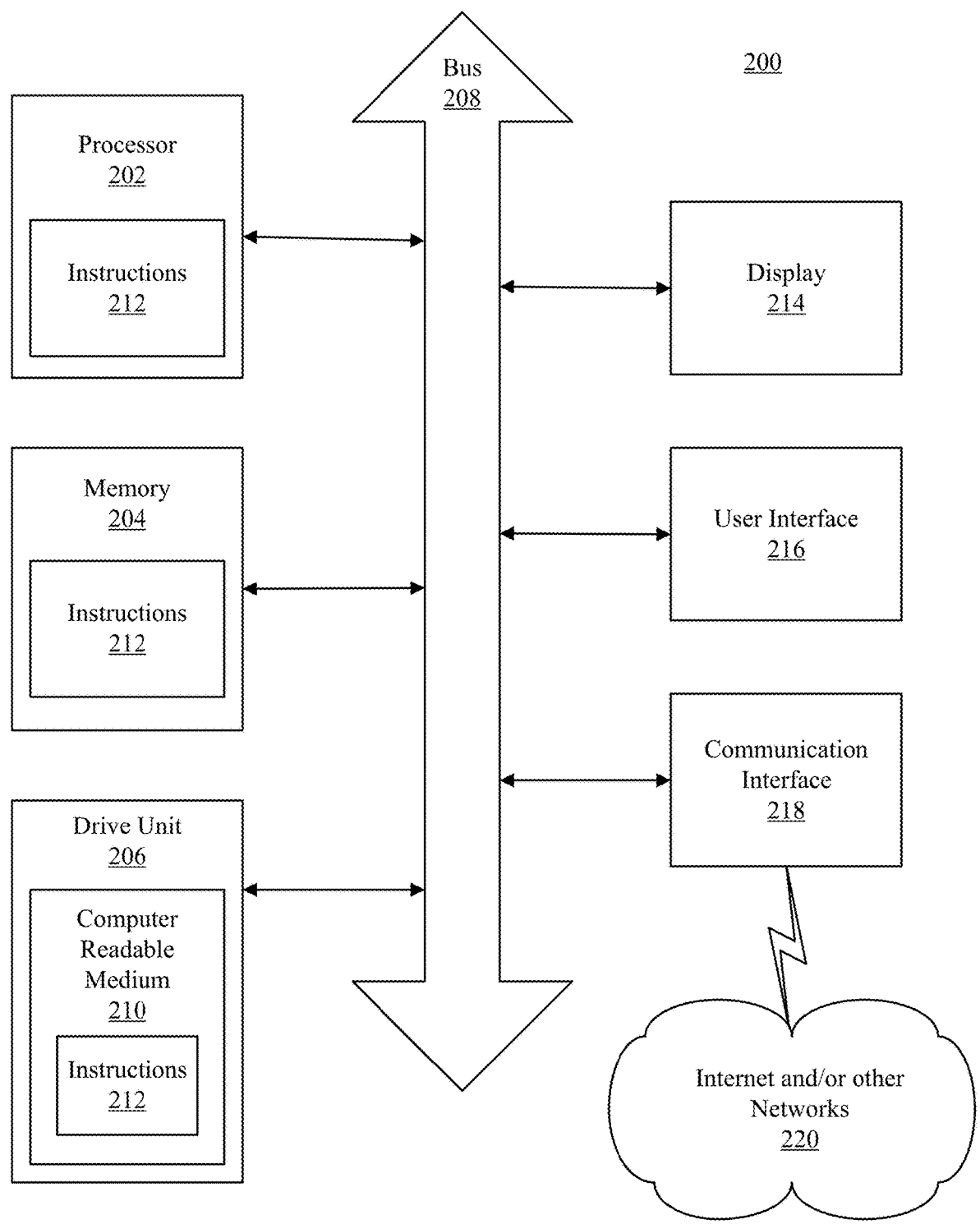
FIG. 2 depicts a general computer system, according to some embodiments.

The exchange computer system 100 may be implemented with one or more mainframe, desktop, or other computers, such as the example computer 200 described herein with respect to FIG. 2. A user database 102 may be provided which includes information identifying traders and other users of the exchange computer system 100, such as account numbers or identifiers, usernames, and passwords. An account data module 104 may be provided which may process account information that may be used during trades.

A match, or matching, engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage, or maintain one or more margining mechanisms implemented by the exchange computer system 100. Such administration, management or maintenance may include managing a number of database records reflective of margin accounts of the market participants.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk, and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

In some embodiments, the exchange computer system 100 may constrain data inputs to a specified threshold. For example, the exchange computer system 100 may constrain the price of a financial product to a minimum increment. In this embodiment, a transaction evaluator module 122 may be included to automatically enable unconstrained data inputs to the exchange computer system 100 having constrained data inputs. The transaction evaluator module 122, as will be described, enables a user to enter unconstrained data inputs indicative of a new or modified proposed trade with another user for a quantity of a financial product at a price. As described herein, when the users agree to a price that does not comply with the minimum increment of the price determined by the exchange computer system 100, the transaction evaluator module 122 may operate automatically to generate a plurality of substitute trade orders for the financial product that comply with the constraints determined by the exchange computer system 100. In some embodiments, the price of each of the generated plurality of substitute trade orders complies with the minimum increment of the price established by the exchange computer system 100.

In some embodiments, the transaction evaluator module 122 may be configured to receive as inputs: the agreed trade parameters from computer devices 150, 152, 154, 156, and/or 158, which are described below, and the constraints on the financial product being traded by the exchange computer system 100. The transaction evaluator module 122 may be further configured to send as outputs: the substitute trade orders to the settlement module 120 and/or other modules that deal with post-trade matters.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware, or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used.

Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via Wi-Fi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of computer executable instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode, and the like, operating alone or in combination. Likewise, processing strategies may include multiprocessing, multitasking, parallel processing, and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of the computer system 200. The input device 216 may be a number pad, a keyboard, or a cursor control device, such as a mouse, or a joystick, touch screen display, remote control, or any other device operative to interact with the computer system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein may utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, currency, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118.

Transaction Evaluator Module

Figure 3:
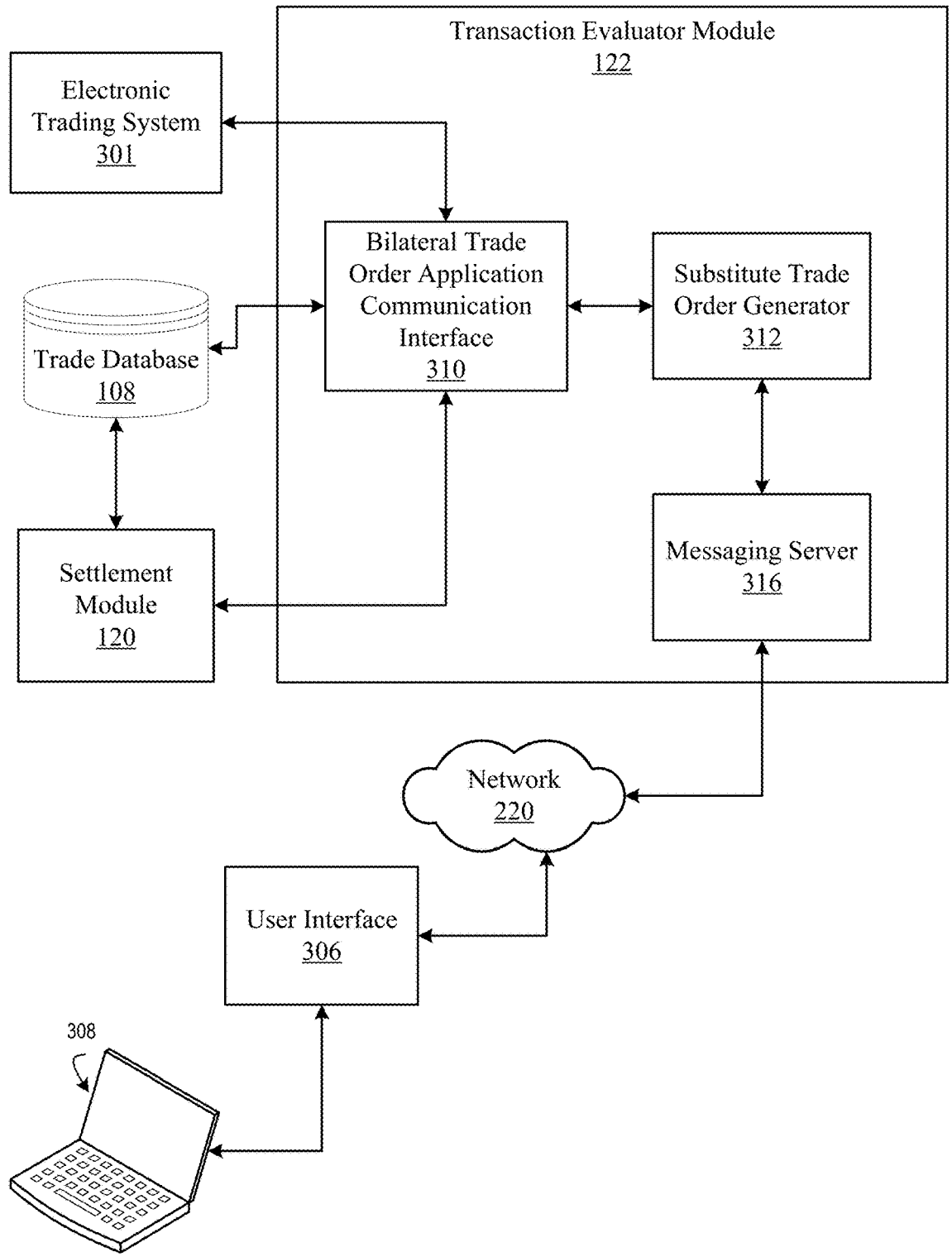
FIG. 3 depicts a block diagram of an unconstrained data input module, according to some embodiments.

FIG. 3 depicts a block diagram 300 of the transaction evaluator module 122 of FIG. 1 for automatically enabling unconstrained data inputs to an electronic trading system 301, such as the exchange computing system 100 described above, having constrained data inputs. The transaction evaluator module 122 may be configured to receive the agreed trade parameters from the client device 308 via the network 220 and the constraints on the financial product being traded by the electronic trading system 301. The transaction evaluator module 122 may be further configured to send the substitute trade orders to the settlement module 120 and/or other modules that handle post-trade matters.

The transaction evaluator module 122 may be implemented as a separate component or as one or more logic components, such as part of one more of the modules of the exchange computing system 100 described above, such as on an FPGA that may include a non-transitory memory such as the memory 204 described above with respect to FIG. 2 or reconfigurable component to store computer executable instructions and processing components to execute the stored computer executable instructions, or as computer program code, stored in the memory, or other non-transitory computer readable medium, and executable by a processor such as the processor 202 described above with respect to FIG. 2.

In one embodiment, the transaction evaluator module 122 may include a substitute trade order generator 312 and a messaging server 316. The messaging server 316 interfaces to, or otherwise may be coupled with a client device 308, such as one of the computer devices 150, 152, 154, 156 and 158 described with respect to FIG. 1, via the network 220. The messaging server 316 may provide communication between the substitute trade order generator 312 and the client device 308 via the network 220.

In one embodiment, the transaction evaluator module 122 may include a bilateral trade order application communication interface 310 which interfaces to, or otherwise may be coupled with, the substitute trade generator 312, the settlement module 120, the trade database 108, and the electronic trading system 301.

Figure 8:
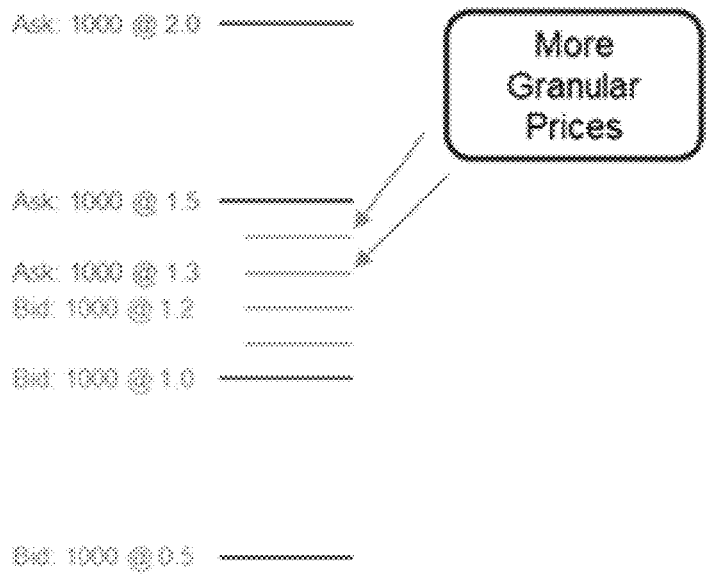
FIG. 8 illustrates a block diagram listing tight granular price levels.
Figure 9:
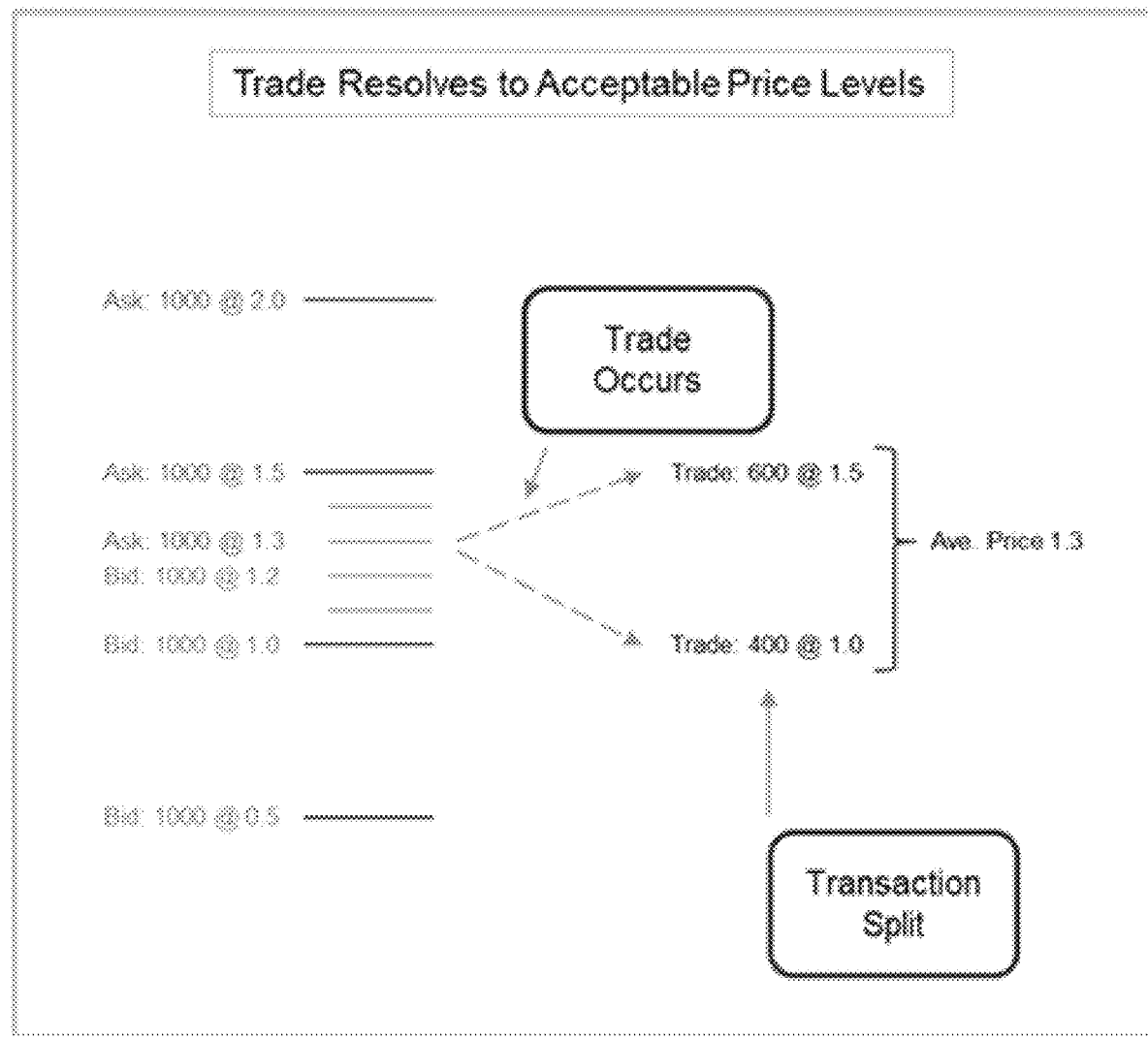
FIG. 9 illustrates a block diagram listing generation of trades at acceptable price levels.

In one embodiment, the substitute trade generator 312 may generate and operate a user interface 306 such as the example interface shown in FIGS. 8 and 9, on a display of the client device 308 associated with one of at least two counterparties and coupled with the network 220. The user interface 306 may be provided via a client application software program executing on the client device or remotely provided, e.g., via a web site based interface provided by the messaging server 316 or other server, and may take the form of a command line/text-based interface, a graphical user interface, menu driven interface, chat or instant message based interface, form based interface, gesture based interface, voice based interface, and/or natural language based interface.

In another embodiment, the client device 308 may execute a client user interface (not shown) via the display provided, for example, by a third party messaging service, such as an instant messaging or chat messaging service. In this embodiment, the messaging server 316 may be connected to the client user interface provided by the user's client device 308, such as via an API or other interface, may monitor the messages including the parameters being input, as well as responses thereto, and may act when it determines an agreed upon trade as described herein.

The user interface 306 may be configured to receive inputs from a user, e.g., the one counterparty, of the client device 308 and to transmit those received inputs to the messaging server 316 via the network 220. The one counterparty may provide inputs indicative of one of a new or modified proposed trade with the other counterparty of the at least two counterparties for a quantity of a financial product at a price. In one embodiment, the bilateral order application communication interface 310 may determine that the price is constrained to a minimum increment. In another embodiment, the minimum increment is determined by the electronic trading system 301. In one embodiment, even though the price is constrained to a minimum increment, the user interface 306 does not constrain the price input to the minimum increment.

The user interface 306 may be further configured to receive data from the messaging server 316 and to present the received data on the display. The data received from the messaging server 316 may include the other counterparty's responses thereto.

In one embodiment, the client device 308 may be operating an independently provided communication system, such as a chat or instant messaging (IM) system to enable communication between the counterparties. In this embodiment, the messaging server 316 may be coupled with the independently provided communication system, such as via an application program interface, to be able to monitor the messages being exchanged between the counterparties.

In one embodiment, the substitute trade order generator 312 may determine, automatically based on the inputs from the one counterparty and the data received from the messaging server 316 indicative of the other counterparty's responses, when the one counterparty and the other counterparty have agreed to a proposed trade for the financial product, and may further determine the parameters thereof, including an agreed price and an agreed quantity.

The substitute trade order generator 312 may determine, based on the determination of the agreed proposed trade, a minimum trade quantity and a minimum increment of the price for the financial product to which the trade orders therefore are constrained by the electronic trading system 301.

The substitute trade order generator 312 may determine that the agreed price does not comply with the minimum increment of the price and, based thereon: generate a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price; transmit the plurality of substitute trade orders to at least the one counter party for acceptance of submission to the electronic trading system 301 via the messaging server 316 for execution in lieu of submitting the agreed proposed trade; and submit automatically upon receiving an input indicative of acceptance from the messaging server 316, the plurality of substitute trade orders to the bilateral trade application communication interface 310 to send the substitute trade orders to the settlement module 120 and/or other modules that handle post-trade matters in lieu of submitting the agreed proposed trade.

Figure 4:
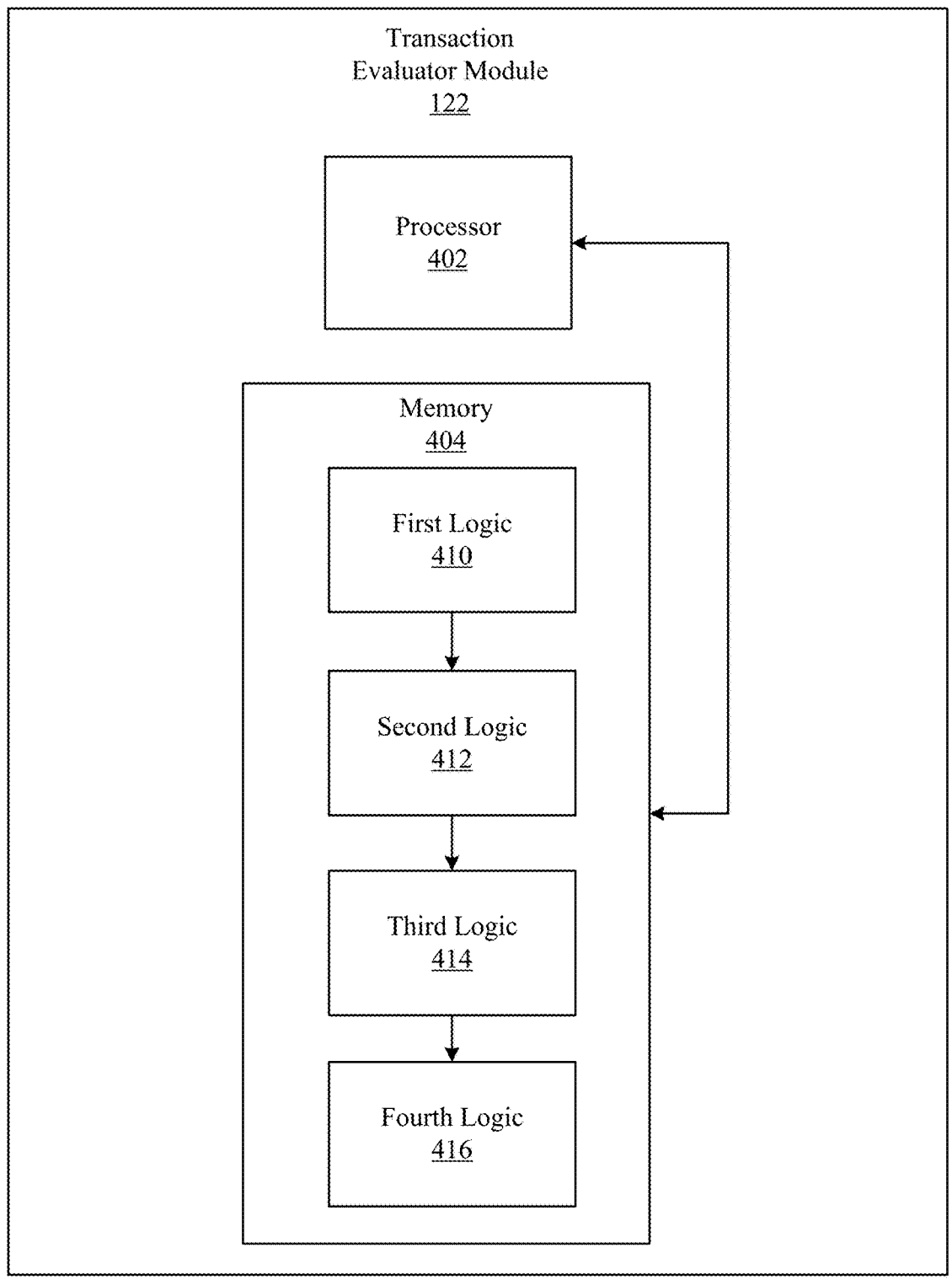
FIG. 4 depicts a more detailed block diagram of the unconstrained data input module, according to some embodiments.

FIG. 4 depicts a more detailed block diagram 400 of the transaction evaluator module 122 of FIG. 3 for automatically enabling unconstrained data inputs to an electronic trading system 301, having constrained data inputs.

In one embodiment, the transaction evaluator module 122 includes: a processor 402, such as the processor 202 described above with respect to FIG. 2, coupled with the electronic trading system 301 and a memory 404, such as the memory 204 described above with respect to FIG. 2, coupled with the processor 402. The memory 404 stores computer executable instructions executable by the transaction evaluator module 122 to cause the processor 402 to cause, via the network 220, presentation of a user interface 306, such as the example interface depicted in FIGS. 8 and 9, on a display of a client device 308 associated with one of at least two counterparties and coupled with the network 220. The user interface 306 is configured to receive inputs from a user, e.g., the one counterparty, of the client device 308 and to transmit those received inputs to the transaction evaluator module 122 via the network 220. The one counterparty provides inputs indicative of one of a new or modified proposed trade with the other counterparty of the at least two counterparties for a quantity of a financial product at a price. The data received from the processor 402 includes the other counterparty's responses thereto. In this embodiment, the user interface 306 and the processor 402 do not constrain the price to a minimum increment. The user interface 306 is further configured to receive data from the processor 402 and to present the received data on the display.

The memory 404 stores computer executable instructions executable by the transaction evaluator module 122 to cause the processor 402 to determine, automatically based on the inputs from the one counterparty and the data received from the processor 402 indicative of the other counterparty's responses, when the one counterparty and the other counterparty have agreed to a proposed trade for the financial product, and to further determine the parameters thereof, including an agreed price and an agreed quantity.

The memory 404 stores computer executable instructions executable by the transaction evaluator module 122 to cause the processor 402 to determine, based on the determination of the agreed proposed trade, a minimum trade quantity and a minimum increment of the price for the financial product to which the trade orders therefore are constrained by the electronic trading system 301.

The memory 404 stores computer executable instructions executable by the transaction evaluator module 122 to cause the processor 402 to determine that the agreed price does not comply with the minimum increment of the price and, based thereon: generate a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price; present the plurality of substitute trade orders to at least the one counter party for acceptance of submission to the electronic trading system 301 for execution in lieu of submitting the agreed proposed trade; and submit automatically upon receiving an input indicative of acceptance, the plurality of substitute trade orders to the electronic trading system 301 for execution in lieu of submitting the agreed proposed trade.

In one embodiment, the electronic trading system 301 may determine the minimum trade quantity and/or the minimum increment of the price for the financial product. In one embodiment, the financial product may be one of a plurality of financial products and the minimum trade quantity and/or the minimum increment of the price may be different for each of the plurality of financial products. In one embodiment, the trade may be a block trade. For example, the electronic trading system may determine rules that govern block trades in CME ClearPort. Block trades may be permitted in specified products and are subject to minimum transaction size requirements which may vary according to the product, the type of transaction and the time of execution. Financial products may include but are not limited to interest rates, FX, Agriculture, Energy, Metals, and Equity products. In one embodiment, the electronic trading system 301 may determine that the minimum trade quantity for EUR/USD Futures (quarterly expiries) is 250 and that the minimum increment of the price is $0.00005.

In one embodiment, the computer executable instructions stored in the memory 404 may further cause the processor 402 to generate automatically at least two substitute trade orders.

In one embodiment, each of the plurality of substitute trade orders may be multiple times the minimum trade quantity. For example, to be compliant with block trading rules, the substitute transactions for EUR/USD Futures (quarterly expiries) may be multiple times of 250, which is the minimum trade quantity.

In one embodiment, the electronic trading system 301 may be a foreign exchange market trading system. The disclosed embodiments may also apply to other types of exchange market trading systems.

In one embodiment, the computer executable instructions stored in the non-transitory memory may further cause the processor 402 to report the execution of the plurality of substitute trade orders within a minimum time period to the electronic trading system 301. For example, the electronic trading system 301 may determine that after a block trade is consummated, the block trade may be submitted to the electronic trading system 301 via CME Direct or CME ClearPort within 5 or 15 minutes, depending on the product. Submission via CME Direct or CME ClearPort may result in a price report to the marketplace and submission to CME Clearing provided both sides of the trade pass the required credit check and the relevant terms of the respective sides of the trade match. In this example, once the processor 402 determines that the counterparties have agreed to a trade, the processor 402 may report the substitute trade orders to the electronic trading system 301 within 15 minutes.

In one embodiment, the computer executable instructions stored in the memory 404 may further cause the processor 402 to receive via the user interface 306, a modification to at least one of the price or quantity of the plurality of substitute trade orders. In this embodiment, one of the counterparties may not be satisfied with the price or the quantity of the substitute trade orders and may request new values for these parameters. The processor 402 may then generate new values that conform with the price and the quantity constraints and may display the new values to both counterparties for acceptance.

In one embodiment, the computer executable instructions stored in the memory 404 may further cause the processor 402 to determine that the plurality of substitute trade orders cannot be generated to achieve the agreed price and based thereon, the computer executable instructions stored in the memory 404 may further cause the processor 402 to notify the two counterparties via the user interface 306.

Referring to FIG. 4, in another embodiment, the transaction evaluator module 122 may be implemented as one or more separate components or as one or more logic components, e.g. first through fourth logic 410-416, such as on an FPGA that may include the memory 404 or a reconfigurable component to store logic and processing component to execute the stored logic, or as computer program logic, stored in the memory 404, or other non-transitory computer readable medium, and executable by the processor 402, to cause the processor 402 to, or otherwise be operative to, implement the above described operations.

In this embodiment, the memory 404 includes first logic 410 stored in the memory 404 and configured to be executed by the processor 402 to cause the processor 402 to cause, via the network 220 described above with respect to FIG. 2, presentation of the user interface 306, described above with respect to FIG. 3, on a display of the client device 308, described above with respect to FIG. 3, associated with one of at least two counterparties and coupled with the network 220, the user interface 306 configured to receive inputs from the one counterparty and transmit those received inputs to the processor 402 via the network, and further configured to receive data from the processor 402 and present the received data on the display, wherein the one counterparty provides inputs indicative of one of a new or modified proposed trade with the other counterparty of the at least two counterparties for a quantity of a financial product at a price, and the data received from the processor 402 comprises the other counterparty's responses thereto, wherein the user interface 306 and the processor 402 do not constrain the price to a minimum increment; second logic 412 stored in the memory 404 and configured to be executed by the processor 402 to determine, automatically based on the inputs from the one counterparty and the data received from the processor 402 indicative of the other counterparty's responses, when the one counterparty and the other counterparty have agreed to a proposed trade for the financial product, and further determining the parameters thereof, including an agreed price and an agreed quantity; third logic 414 stored in the memory 404 and configured to be executed by the processor 402 to cause the processor 402 to determine, based on the determination of the agreed proposed trade, a minimum trade quantity and a minimum increment of the price for the financial product to which substitute trade orders therefore are constrained by the electronic trading system; fourth logic 416 stored in the memory 404 and configured to be executed by the processor 402 to cause the processor 402 to determine that the agreed price does not comply with the minimum increment of the price and, based thereon: generate a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price; present the plurality of substitute trade orders to at least the one counter party for acceptance of submission to the electronic trading system for execution in lieu of submitting the agreed proposed trade; and submit, automatically upon receiving an input indicative of acceptance, the plurality of substitute trade orders to the electronic trading system for execution in lieu of submitting the agreed proposed trade.

Figure 5:
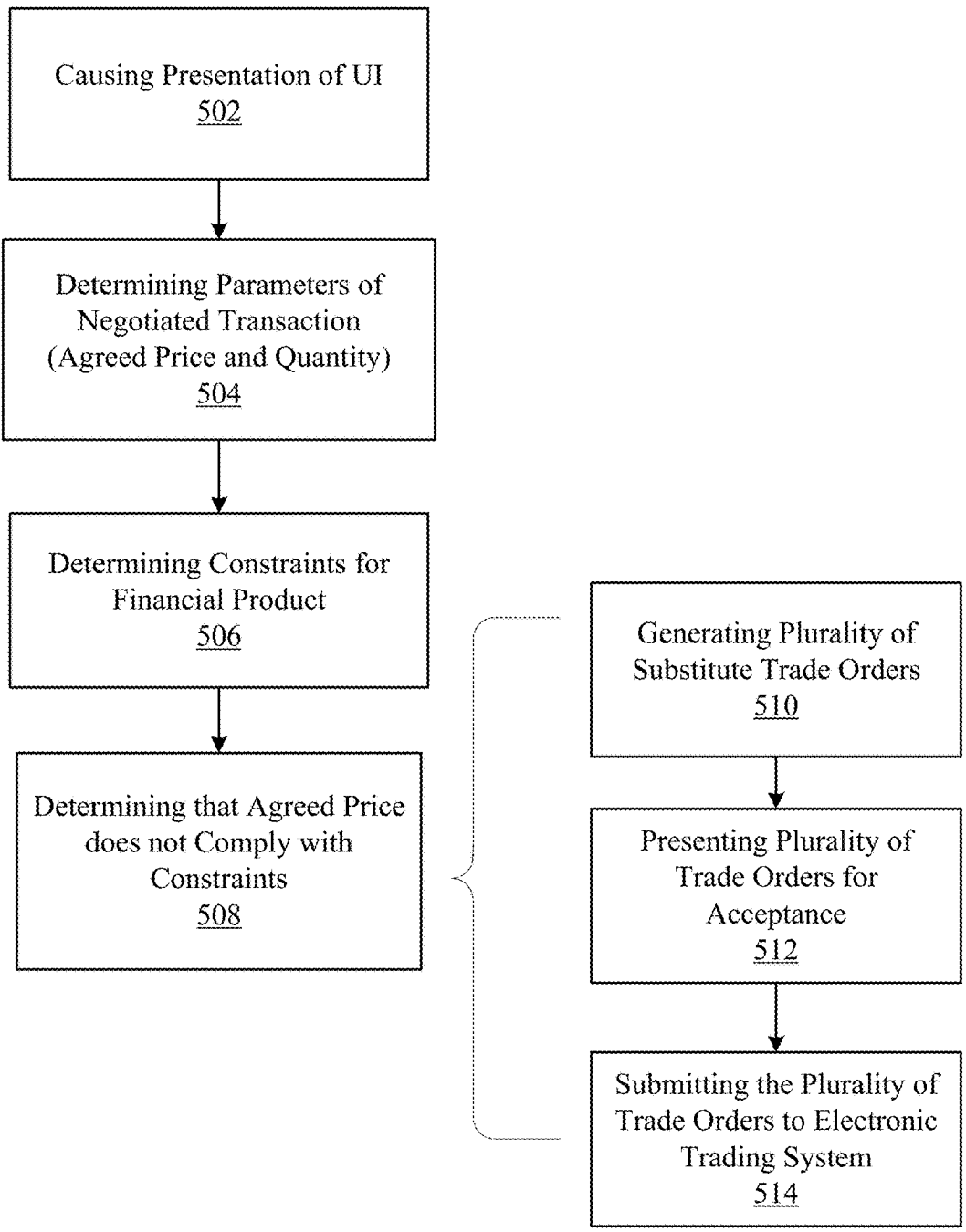
FIG. 5 illustrates an example flowchart showing example operation of the exchange computer system of FIGS. 1-4.

FIG. 5 illustrates an example flowchart 500 of the operation of the transaction evaluator module 122 shown in FIG. 3 and FIG. 4. In one embodiment, the operation of the transaction evaluator module 122 includes: causing, by the processor 402 coupled with the electronic trading system 301 via the network 220, presentation of a user interface 306 on a display of a client device 308 associated with one of at least two counterparties and coupled with the network 220, the user interface 306 configured to receive inputs from the one counterparty and transmit those received inputs to the processor 402 via the network 220, and further configured to receive data from the processor 402 and present the received data on the display, wherein the one counterparty provides inputs indicative of one of a new or modified proposed trade with the other counterparty of the at least two counterparties for a quantity of a financial product at a price, and the data received from the processor 402 comprises the other counterparty's responses thereto, wherein the user interface 306 and the processor 402 do not constrain the price to a minimum increment (Block 502); determining, automatically by the processor 402, based on the inputs from the one counterparty and the data received from the processor 402 indicative of the other counterparty's responses, when the one counterparty and the other counterparty have agreed to a proposed trade for the financial product, and further determining the parameters thereof, including an agreed price and an agreed quantity (Block 504); determining, by the processor 402 based on the determination of the agreed proposed trade, a minimum trade quantity and a minimum increment of the price for the financial product to which substitute trade orders therefore are constrained by the electronic trading system 301 (Block 506); determining, by the processor 402, that the agreed price does not comply with the minimum increment of the price (Block 508) and, based thereon: generating, by the processor 402, a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price (Block 510); presenting, by the processor 402, the plurality of substitute trade orders to at least the one counter party for acceptance of submission to the electronic trading system 301 for execution in lieu of submitting the agreed proposed trade (Block 512); and submitting, automatically by the processor 402 upon receiving an input indicative of acceptance, the plurality of substitute trade orders to the electronic trading system for execution in lieu of submitting the agreed proposed trade (Block 514).

In one embodiment, the electronic trading system 301 may determine the minimum trade quantity and/or the minimum increment of the price for the financial product.

In one embodiment, the financial product may be one of a plurality of financial products and the minimum trade quantity and/or the minimum increment of the price may be different for each of the plurality of financial products. In one embodiment, the generating may further comprise generating, automatically by the processor, at least two substitute trade orders. In one embodiment, the trade may be a block trade. In one embodiment, each of the plurality of substitute trade orders may be multiple times the minimum trade quantity. In one embodiment, the electronic trading system may be a foreign exchange currency trading system.

In one embodiment, the operation of the transaction evaluator module 122 may further include reporting the execution of the plurality of substitute trade orders within a minimum time period to the electronic trading system 301.

In one embodiment, the operation of the transaction evaluator module 122 may further include receiving, by the processor 402 via the user interface 306, a modification to at least one of the price or the quantity of the plurality of substitute trade orders.

In one embodiment, the operation of the transaction evaluator module 122 may further include determining, by the processor 402, that the plurality of substitute trade orders cannot be generated to achieve the agreed price and based thereon: notifying the two counterparties via the user interface 306.

In one embodiment, the counterparties may be involved in a hybrid relationship-based trading for OTC instruments which are centrally cleared. In this embodiment, two counterparties may transact privately, away from the central-limit order book venue. Instead of broadcasting the request to all participants of a market, the counterparties may use a user interface 306 or a dedicated electronic mechanism, e.g., CME Directed RFQ, to privately send a request, negotiate, and book the OTC transaction. When a deal is negotiated through the user interface 306, parameters such as a quantity and a price of the OTC transaction are agreed to in the back-and-forth negotiation. A central clearing system 301, e.g., CME ClearPort, may support the booking of the standardized products that are traded by the counterparties in the privately-negotiated transactions. Once the counterparties agree, the transactions may be booked into the central clearing system 301 once consummated.

In one embodiment, the counterparties may trade a large size transaction in the electronic trading system 301. In one embodiment, the electronic trading system 301 may use block trading as a mechanism to provide a pathway for large trades to be transacted as futures. As stated above, the electronic trading system 301 may determine rules and regulations that require that block trades occur at a specific quantity and price/tick increments.

Figure 6:
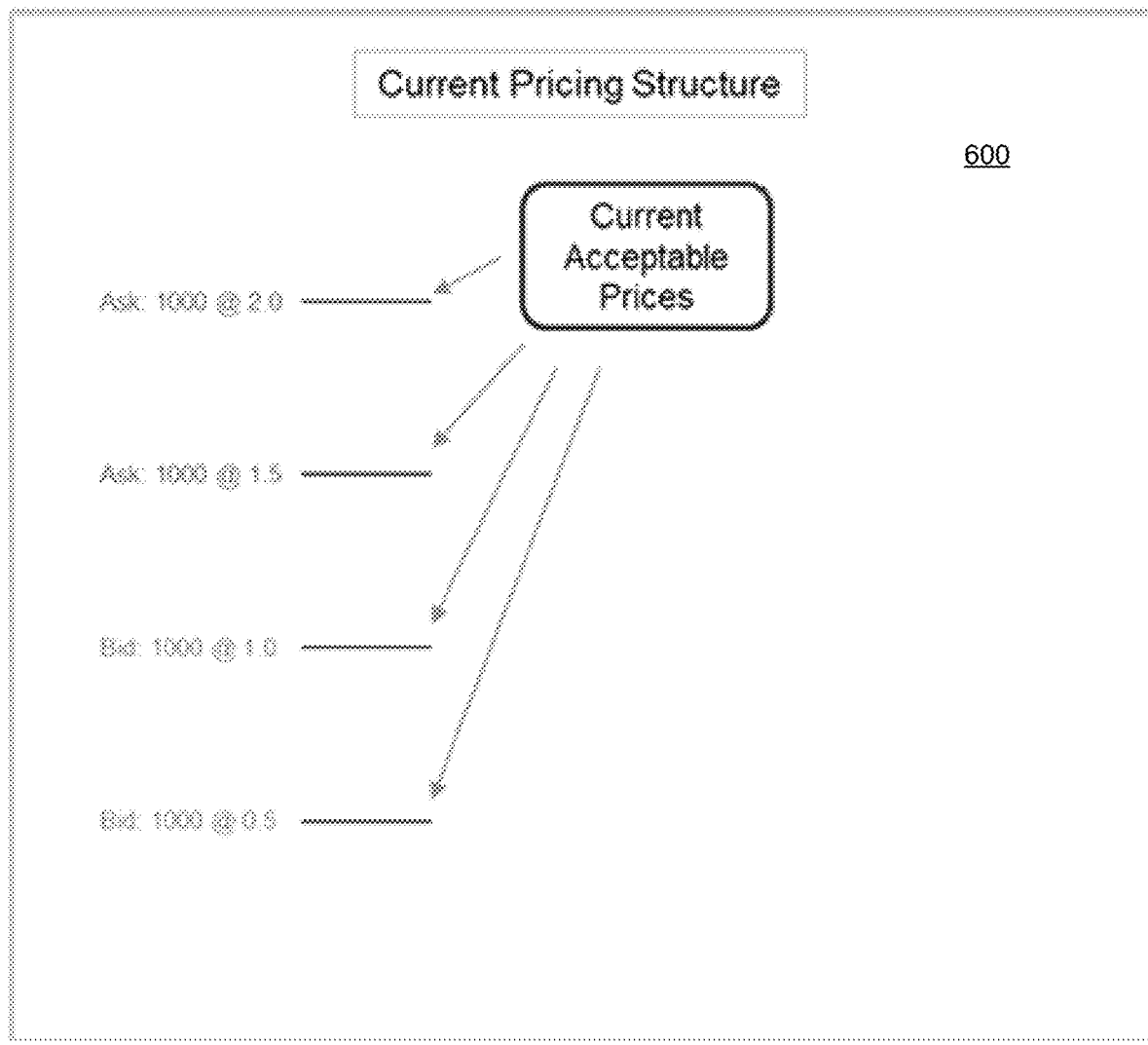
FIG. 6 illustrates a block diagram listing current pricing structure.

FIG. 6 depicts a diagram of a typical user interface 600 that allows a counterparty to select a quantity and a price for a financial product at acceptable price levels that comply with the rules and regulations determined by the electronic trading system 301. In an embodiment, the counterparties, may trade in an FX futures market trading system. As shown in FIG. 6, the accepted standard prices in the FX futures market trading system may be x.0 and x.5. The typical user interface 600 as shown in FIG. 6 only allows the user to choose a minimum price increment that complies with the constrain.

Figure 7:
FIG. 7 illustrates a block diagram listing current trades at acceptable trade price levels.

FIG. 7 depicts a diagram of the typical user interface 600 shown in FIG. 6 with trades at acceptable levels. The user interface 600 displays a 1,000 lot trade between the two counterparties at an agreed price of 1.5 per unit, which complies with the minimum price increment constrain. However, if any of the counterparties is interested in entering an input of a 1,000 lot trade to take place at a price level of x.1, the user interface 600 does not allow the input since x.1 is not an acceptable price level for the transaction.

FIG. 8 depicts a diagram of the user interface 306 of the computer system 300 in an electronic trading system 301 shown in FIG. 3 according to one embodiment. In this embodiment, the user interface 306 accepts inputs for a new or modified trade proposed trade for a financial product from each of the counterparties. The received inputs may or may not comply with the price increment constrain determined by the electronic trading system 301. The user interface 306 sends the data indicative of the trade to the transaction evaluation module 122. The transaction evaluation module 122 of the computer system 300 determines when the counterparties agree on parameters such as the quantity and the price of the new or modified proposed trade in the back-and-forth negotiation.

The transaction evaluation module 122 determines automatically, based on the inputs from the counterparties, the parameters of the new or proposed trade including an agreed price and an agreed quantity. Based on the determination of the agreed proposed trade, the transaction evaluator module 122 determines a minimum trade quantity and a minimum increment of the price for the financial product. In other words, the trade orders are constrained by the electronic trading system 301. The transaction evaluator module 122 determines if the quantity of the agreed proposed trade complies with the minimum trade quantity. If the agreed proposed trade does not comply with the minimum trade quantity, the transaction evaluator module 122 may send data to the user interface 306 indicating that the agreed proposed trade does not comply with the minimum trade quantity. The user interface 306 may display a notification message via the display of the counter device 308 to the counterparties requesting a new agreed quantity that complies with the minimum trade quantity.

If the agreed quantity for the new or modified proposed trade complies with the minimum trade quantity, the transaction evaluator module 122 determines whether the agreed price of the new or proposed transaction complies with the minimum increment of the price. If the transaction evaluator module 122 determines that the agreed price complies with the minimum increment of the price, the transaction evaluator module 122, automatically submits the agreed trade to the electronic trading system 301.

For example, as shown in FIG. 8, the transaction evaluator module 122 may determine that the minimum quantity is 200 and that the minimum price increment is x.5. The transaction evaluator module 122 may determine that the counterparties agree to a 1,000 lot trade at a price of 1.50. Since the agreed trade complies with the minimum quantity and the minimum price increment, the transaction evaluator module 122, automatically submits the agreed trade of a 1,000 quantity at a price of 1.50 to the electronic trading system 301.

As can be seen in FIG. 8, the user interface 306 allows counterparties to input prices with tighter price granularity than the minimum price increment.

If the transaction evaluator module 122 determines that the agreed price does not comply with the minimum increment of the price, the transaction evaluator module 122, generates a plurality of substitute trade orders that satisfy Equation 1 shown below:

$$\sum_{i=1}^{n}(Q_iP_i) = A_QA_P \text{ where } A_Q \geq Q_{min} \text{ and } T_A \langle \rangle T_{min} \quad \text{Equation 1}$$

In Equation 1 shown above, $Q_i$ is the quantity for each of the plurality of substitute trade orders, $P_i$ is the price for each of the plurality of substitute trade orders conforming to $T_{min}$, $A_Q$ is the agreed quantity, $A_P$ is the agreed price, $T_A$ is the tick/price increment for the agreed price, $Q_{min}$ is the minimum quantity, and $T_{min}$ is the minimum tick/price increment.

In other words, when generating the plurality of substitute trade orders, the summation of the product of the price and the quantity of each of the plurality of substitute trade orders equals the product of the agreed quantity and the agreed price (average price). Put another way, $P_i$ conforms to the standard tick size, e.g., $P_i = N \times T_{min}$ where N in an integer or $P_i$ is divisible by $T_{min}$ whereas $A_P$ is not divisible by $T_{min}$ but does conform to $T_A$, which is, e.g., less than $T_{min}$.

In one embodiment, when a trade is agreed at a more granular price level, the transaction is split by the transaction evaluator module 122 to allocate the volume to the two adjacent price levels that are supported by the product rules. If the transaction evaluator module 122 generates two substitute trade orders, the generated substitute trade orders may have two different price levels in such a manner that the average price of the combined trade is at a particular level between the two prices traded for the financial product. In other words, transactions concluded at a price level which is not a standard price level may result in two block trades occurring, each at acceptable price levels.

In one embodiment, even though the minimum price increment for trading a financial product may be x.5, the user interface 306 allows the counterparties to agree to a 1,000 trade lot at an average price of 1.3. In other words, even though the electronic trading system 301 determines a constrain of a minimum of x.5, the counterparties may agree to a price of 1.3 without the price increment constraint.

As shown in the embodiment of FIG. 9, when the transaction evaluator module 122 determines that the agreed price of 1.3 does not meet the constrain, the transaction evaluator module 122 generates a plurality of substitute trades that meet the criteria shown above in Equation 1. As can be seen in FIG. 9, the transaction evaluator module 122 may split the agreed trade and generate two substitute trades that meet the criteria shown in Equation 1: a first trade at a quantity of 600 units at a price of 1.5 per unit; and a second trade at a quantity of 400 units at a price of 1.0 per unit. As mentioned above, the quantity and the price of each of the plurality of trades must be compliant with Equation 1 shown below:

$$Q_1P_1+Q_2P_2=A_QA_P$$

$$(600*1.5)+(400*1.0)=1000*1.3 \quad \text{Equation 1:}$$

Further, the quantity and the price of each of the plurality of trades must be compliant with the minimum quantity and the minimum price increment. For example, if the trades are block trades, to be compliant with block trading rules, both transactions at 1.5 and 1.0 must be block trades in their own right, which implies this solution is only suitable for transactions which are multiple times the size of the block trade size threshold of 200.

The user interface 306 may display the generated plurality of substitute trade orders to the counterparties for acceptance. Once the transaction evaluator module 122 determines acceptance, the transaction evaluator module 122 may submit and report the generated plurality of substitute trade orders to the electronic trading system 301 within a certain time limit, e.g., 15 minutes after agreement has been reached between both counterparties.

FIG. 10 is a table showing how trades at more granular prices can be allocated to acceptable price points according to one embodiment. In this embodiment, the 200 lot, the smallest trade generated, is equal to or exceeds the minimum block trade size of 200.

In essence, with the aid of price blending, block transactions may be quoted with tighter price granularity. Block trades may operate in this solution with an effective tighter tick increment.

The degree of increased granularity may be decided by the operator on a case by case basis. However, it should be noted that for a given starting set of standard price levels and minimum block trade size, a more granular price requires a higher threshold size to participate in the solution.

As can be seen from the embodiments above, counterparties do not need to figure out quantities at different prices to achieve the average price. The counterparties are not picking a tick size. Instead, they are agreeing on an actual price which may be at a tick granularity different from the standard tick size. The computer system 300 enables the trade to happen at the desired price.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above may be altered in various ways. For example, the order of the logic may be rearranged, sub steps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods, and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for automatically enabling unconstrained data inputs to an electronic trading system having constrained data inputs, the computer implemented method comprising:
   causing, by a processor coupled with the electronic trading system via a network, presentation of a user interface on a display of a client device associated with one of at least two counterparties and coupled with the network, the user interface configured to receive inputs from the one counterparty and transmit those received inputs to the processor via the network, and further configured to receive data from the processor and present the received data on the display, wherein the one counterparty provides inputs indicative of one of a new or modified proposed trade with the other counterparty of the at least two counterparties for a quantity of a financial product at a price, and the data received from the processor comprises the other counterparty's responses thereto, wherein the user interface and the processor do not constrain the price to a minimum increment;
   determining, automatically by the processor, based on the inputs from the one counterparty and the data received from the processor indicative of the other counterparty's responses, when the one counterparty and the other counterparty have agreed to a proposed trade for the financial product, and further determining the parameters thereof, including an agreed price and an agreed quantity;
   determining, by the processor based on the determination of the agreed proposed trade, a minimum trade quantity and a minimum increment of the price for the financial product to which trade orders therefore are constrained by the electronic trading system;
   determining, by the processor, that the agreed price does not comply with the minimum increment of the price and, based thereon:
      generating, by the processor, a plurality of substitute trade orders for the financial product, each of the plurality of substitute trade orders being for a quantity less than the agreed quantity and at least the minimum trade quantity and for a price, which complies with the minimum increment of the price, wherein the summation of the product of the price and the quantity of each of the plurality of substitute trade orders equals the product of the agreed quantity and the agreed price;
      presenting, by the processor, the plurality of substitute trade orders to at least the one counter party for acceptance of submission to the electronic trading system for execution in lieu of submitting the agreed proposed trade; and
      submitting, automatically by the processor upon receiving an input indicative of acceptance, the plurality of substitute trade orders to the electronic trading system for execution in lieu of submitting the agreed proposed trade.

2. The computer implemented method of claim 1, wherein the electronic trading system determines the minimum trade quantity and/or the minimum increment of the price for the financial product.

3. The computer implemented method of claim 1, wherein the financial product is one of a plurality of financial products and wherein the minimum trade quantity and/or the minimum increment of the price are different for each of the plurality of financial products.

4. The computer implemented method of claim 1, wherein the generating further comprises generating, automatically by the processor, at least two substitute trade orders.

5. The computer implemented method of claim 1, wherein the trade is a block trade.

6. The computer implemented method of claim 1, wherein each of the plurality of substitute trade orders is multiple times the minimum trade quantity.

7. The computer implemented method of claim 1, wherein the electronic trading system is a foreign exchange currency trading system.

8. The computer implemented method of claim 1, further comprising:
   reporting the execution of the plurality of substitute trade orders within a minimum time period to the electronic trading system.

9. The computer implemented method of claim 1, further comprising:
   receiving, by the processor via the user interface, a modification to at least one of the price or the quantity of the plurality of substitute trade orders.

10. The computer implemented method of claim 1, further comprising:
   determining, by the processor, that the plurality of substitute trade orders cannot be generated to achieve the agreed price and based thereon:
   notifying the two counterparties via the user interface.

11. A computer system for automatically enabling unconstrained data inputs to an electronic trading system having constrained data inputs, the computer implemented method comprising:
   a processor coupled with the electronic trading system via a network;
   a non-transitory memory coupled with the processor, the non-transitory memory storing computer executable instructions executable by the computer system to cause the processor to:
   cause presentation of a user interface on a display of a client device associated with one of at least two counterparties and coupled with the network, the user interface configured to receive inputs from the one counterparty and transmit those received inputs to the processor via the network, and further configured to receive data from the processor and present the received data on the display, wherein the one counterparty provides inputs indicative of one of a new or modified proposed trade with the other counterparty of the at least two counterparties for a quantity of a financial product at a price, and the data received from the processor comprises the other counterparty's responses thereto, wherein the user interface and the processor do not constrain the price to a minimum increment;
   determine, automatically based on the inputs from the one counterparty and the data received from the processor indicative of the other counterparty's responses, when the one counterparty and the other counterparty have agreed to a proposed trade for the financial product, and further determine the parameters thereof, including an agreed price and an agreed quantity;
   determine, based on the determination of the agreed proposed trade, a minimum trade quantity and a minimum increment of the price for the financial product to which trade orders therefore are constrained by the electronic trading system, determine that the agreed price does not comply with the minimum increment of the price and, based thereon:
   generate a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price;
   present the plurality of substitute trade orders to at least the one counter party for acceptance of submission to the electronic trading system for execution in lieu of submitting the agreed proposed trade; and submit automatically upon receiving an input indicative of acceptance, the plurality of substitute trade orders to the electronic trading system for execution in lieu of submitting the agreed proposed trade.

12. The computer system of claim 11, wherein the electronic trading system determines the minimum trade quantity and/or the minimum increment of the price for the financial product.

13. The computer system of claim 11, wherein the financial product is one of a plurality of financial products and wherein the minimum trade quantity and/or the minimum increment of the price are different for each of the plurality of financial products.

14. The computer system of claim 11, wherein the computer executable instructions stored in the non-transitory memory further cause the processor to generate automatically at least two substitute trade orders.

15. The computer system of claim 11, wherein the trade is a block trade.

16. The computer system of claim 11, wherein each of the plurality of substitute trade orders is multiple times the minimum trade quantity.

17. The computer system of claim 11, wherein the electronic trading system is a foreign exchange market trading system.

18. The computer system of claim 11, wherein the computer executable instructions stored in the non-transitory memory further cause the processor to report the execution of the plurality of substitute trade orders within a minimum time period to the electronic trading system.

19. The computer system of claim 11, wherein the computer executable instructions stored in the memory further cause the processor to receive via the user interface, a modification to at least one of the price or quantity of the plurality of substitute trade orders.

20. The computer system of claim 11, wherein the computer executable instructions stored in the memory further cause the processor to receive via the user interface, a modification to at least one of the price or quantity of the plurality of substitute trade orders.

21. The computer system of claim 11, wherein the computer executable instructions stored in the memory further causes the processor to determine that the plurality of substitute trade orders cannot be generated to achieve the agreed price and based thereon:
   the computer executable instructions stored in the memory further cause the processor to notify the two counterparties via the user interface.

22. A computer system for automatically enabling unconstrained data inputs to an electronic trading system having constrained data inputs, the computer system comprising:
   a processor and a non-transitory memory coupled therewith;
   first logic stored in the non-transitory memory and configured to be executed by the processor to cause the processor to cause, via a network, presentation of a user interface on a display of a client device associated with one of at least two counterparties and coupled with the network, the user interface configured to receive inputs from the one counterparty and transmit those received inputs to the processor via the network, and further configured to receive data from the processor and present the received data on the display, wherein the one counterparty provides inputs indicative of one of a new or modified proposed trade with the other counterparty of the at least two counterparties for a quantity of a financial product at a price, and the data received from the processor comprises the other counterparty's responses thereto, wherein the user interface and the processor do not constrain the price to a minimum increment;
   second logic stored in the memory and configured to be executed by the processor to cause the processor to determine, automatically based on the inputs from the one counterparty and the data received from the processor indicative of the other counterparty's responses, when the one counterparty and the other counterparty have agreed to a proposed trade for the financial product, and further determining the parameters thereof, including an agreed price and an agreed quantity;

third logic stored in the memory and configured to be executed by the processor to cause the processor to determine, based on the determination of the agreed proposed trade, a minimum trade quantity and a minimum increment of the price for the financial product to which trade orders therefore are constrained by the electronic trading system;

fourth logic stored in the memory and configured to be executed by the processor to cause the processor to determine that the agreed price does not comply with the minimum increment of the price and, based thereon:

generate a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price;

present the plurality of substitute trade orders to at least the one counter party for acceptance of submission to the electronic trading system for execution in lieu of submitting the agreed proposed trade; and submit, automatically upon receiving an input indicative of acceptance, the plurality of substitute trade orders to the electronic trading system for execution in lieu of submitting the agreed proposed trade.

23. A system for automatically enabling unconstrained data inputs to an electronic trading system having constrained data inputs, the computer implemented method comprising:

means for causing presentation of a user interface on a display of a client device associated with one of at least two counterparties and coupled with the network, the user interface configured to receive inputs from the one counterparty and transmit those received inputs to the processor via the network, and further configured to receive data from the processor and present the received data on the display, wherein the one counterparty provides inputs indicative of one of a new or modified proposed trade with the other counterparty of the at least two counterparties for a quantity of a financial product at a price, and the data received from the processor comprises the other counterparty's responses thereto, wherein the user interface and the processor do not constrain the price to a minimum increment;

means for determining, automatically based on the inputs from the one counterparty and the data received from the processor indicative of the other counterparty's responses, when the one counterparty and the other counterparty have agreed to a proposed trade for the financial product, and further determining the parameters thereof, including an agreed price and an agreed quantity;

means for determining, based on the determination of the agreed proposed trade, a minimum trade quantity and a minimum increment of the price for the financial product to which trade orders therefore are constrained by the electronic trading system;

means for determining that the agreed price does not comply with the minimum increment of the price and, based thereon:

means for generating a plurality of substitute trade orders for the financial product, each of the plurality of substitute trade orders being for a quantity less than the agreed quantity and at least the minimum trade quantity and for a price which complies with the minimum increment of the price, wherein the summation of the product of the price and the quantity of each of the plurality of substitute trade orders equals the product of the agreed quantity and the agreed price;

means for presenting the plurality of substitute trade orders to at least the one counter party for acceptance of submission to the electronic trading system for execution in lieu of submitting the agreed proposed trade; and means for submitting, automatically upon receiving an input indicative of acceptance, the plurality of substitute trade orders to the electronic trading system for execution in lieu of submitting the agreed proposed trade.

* * * * *